(12) United States Patent
Iwasaki et al.

(10) Patent No.: US 6,494,185 B2
(45) Date of Patent: Dec. 17, 2002

(54) FUEL INJECTION CONTROL APPARATUS AND METHOD FOR VARIABLY OPERATED ENGINE VALVE EQUIPPED INTERNAL COMBUSTION

(75) Inventors: Tetsuya Iwasaki, Tokyo (JP); Yoshiaki Yoshioka, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/058,295

(22) Filed: Jan. 30, 2002

(65) Prior Publication Data

US 2002/0104512 A1 Aug. 8, 2002

(30) Foreign Application Priority Data

Feb. 5, 2001 (JP) ........................................ 2001-028822

(51) Int. Cl.[7] ............................................... F02M 51/00
(52) U.S. Cl. ......................... 123/478; 123/472; 123/480
(58) Field of Search ................................ 123/478, 472, 123/480, 492, 406.11

(56) References Cited

U.S. PATENT DOCUMENTS

| 4,911,133 A | | 3/1990 | Sogawa | ........................ 123/494 |
| 5,546,907 A | * | 8/1996 | Komoriya et al. | ........... 123/478 |
| 6,328,007 B1 | | 12/2001 | Hirasawa et al. | ........ 123/90.15 |

FOREIGN PATENT DOCUMENTS

| EP | 1 074 716 A2 | 2/2001 |
| JP | 2001-50091 | 2/2001 |

OTHER PUBLICATIONS

U.S. patent application Ser. No. 10/058,294, Iwaskai et al., filed Jan. 30, 2002.
U.S. patent application Ser. No. 10/062,566, Hoshino et al., filed Feb. 5, 2002.

* cited by examiner

Primary Examiner—Bibhu Mohanty
(74) Attorney, Agent, or Firm—Foley & Lardner (57) ABSTRACT

In fuel injection control apparatus and method for an engine having a variably operated engine valve in which at least a closure timing of an intake valve is variably controlled, a controller determines whether an actual closure timing of the intake valve is in a steady state, calculates a volume of a cylinder calculated from a target control value of the closure timing of the intake valve when determining that the actual closure timing is in the steady state and a fresh-air rate within the cylinder, calculates a mass air quantity sucked into the cylinder on the basis of a mass air quantity within an intake manifold calculated by income and outgo calculations of inflow and outflow quantities of a mass air within the intake manifold and a volume of the manifold, and calculates a fuel injection quantity on the basis of the mass air quantity sucked into the cylinder.

18 Claims, 8 Drawing Sheets

S; STROKE VARIABLE DURING IVC
L; CONNECTING ROD LENGTH
r; St/2 (St: STROKE LENGTH BY WHICH PISTON STROKES FROM TDC TO BDC)
θ; IVC ANGLE (ABDC)

θ = 110° - VTC ANGLE

CYLINDER VOLUME Vc = A × S
STROKE VARIABLE S = r · cosθ + L + r - $\sqrt{L^2 - r^2 \sin^2 θ}$

FUEL INJECTION CONTROL APPARATUS AND METHOD FOR VARIABLY OPERATED ENGINE VALVE EQUIPPED INTERNAL COMBUSTION

BACKGROUND OF THE INVENTION

1. Field of the Invention

The present invention relates generally to fuel injection control apparatus and method for a variably operated engine valve equipped internal combustion engine and, more specifically, relates to a technique of preventing a variation in a pulsewidth Tp of a fuel injection quantity signal outputted to a fuel injector of an engine cylinder.

2. Description of the Related Art

In order to execute accurately a fuel injection quantity control or an air-fuel ratio control in an engine having a variably operated engine valve in which open/closure timings of an intake valve(s) is variably controlled, it is necessary to calculate a cylinder intake-air quantity, with a cylinder volume which is substantially varied according to a control over the closure timing of the intake valve(s) taken into consideration.

A European Patent Application Publication No. EP 1 074 716 A2 published on Feb. 7, 2001 (which corresponds to a U.S. patent application Ser. No. 09/634,008 which has been allowed on Jul. 27, 2001 and corresponds to a Japanese Patent Application First Publication No. 2001-50091 published on Feb. 23, 2001) exemplifies a previously proposed internal cylinder intake-air quantity calculating apparatus. In details, in this previously proposed internal cylinder intake-air quantity calculating apparatus, an actual closure timing of the intake valve is detected, an internal cylinder volume air quantity is calculated on the basis of the cylinder volume calculated from the actual closure timing of the intake valve and a fresh-air rate within the cylinder. Then, a mass air quantity within an intake manifold is calculated. Then, a cylinder intake-air quantity (mass air quantity) is calculated on the basis of the internal cylinder volume air quantity, the mass air quantity within the intake manifold, and an intake air manifold volume. In this way, the cylinder intake-air quantity is accurately calculated according to the above-described calculation procedure and the fuel injection quantity (fuel injection pulsewidth Tp) is calculated on the basis of the cylinder intake-air quantity.

SUMMARY OF THE INVENTION

However, since, in the above-described previously proposed internal cylinder intake-air quantity calculating apparatus, the cylinder intake-air quantity is calculated according to a detected value of the intake valve closure timing even in a case where the closure timing of the intake valve is in a steady state, the actual intake valve closure timing detected value (VTCNOW) is varied due to a load variation or bit-error so that the fuel injection pulsewidth Tp is accordingly varied. Consequently, a variation in the air-fuel ratio occurs and a driveability of the engine becomes reduced.

It is, hence, an object of the present invention to provide fuel injection control apparatus and method for an internal combustion engine, the engine having a variably operated engine valve in which at least a closure timing of an intake valve is variably controlled, which can achieve suppressions of a variation in an air-fuel ratio and a reduction in an engine driveability by preventing an unnecessary variation in fuel injection pulsewidth Tp in a case wherein the closure timing of the intake valve (IVC) is in the steady state while calculating the cylinder intake-air quantity so as to cope with a variation in the volume of the cylinder.

According to one aspect of the present invention, there is provided a fuel injection control apparatus for an engine having a variably operated engine valve in which at least a closure timing of an intake valve is variably controlled, the fuel injection control apparatus comprising: an intake valve closure state determining section that determines whether a closure timing of the intake valve is in a steady state or in a transient state; and a fuel injection quantity calculating section that calculates a volume of a cylinder from a control target value of the closure timing of the intake valve when the intake valve closure state determining section determines that the closure timing of the intake valve is in the steady state and from an actual closure timing of the intake valve when the intake valve closure state determining section determines that the closure timing of the intake valve is in the transient state, calculates a volume air quantity within the cylinder on the basis of the calculated volume of the cylinder and a fresh-air rate within the cylinder, calculates a mass air quantity sucked into the cylinder on the basis of a mass air quantity within an intake manifold of the engine calculated by income and outgo calculations of inflow and outflow quantities of a mass air within the intake manifold and a volume of the intake manifold, and calculates a fuel injection quantity on the basis of the mass air quantity sucked into the cylinder.

According to another aspect of the present invention, there is provided A fuel injection control method for an engine having a variably operated engine valve in which at least a closure timing of an intake valve is variably controlled, the fuel injection control method comprising: determining whether a closure timing of the intake valve is in a steady state or in a transient state; calculating a volume of a cylinder from a control target value of the closure timing of the intake valve when determining that the closure timing of the intake valve is in the steady state and from an actual closure timing of the intake valve when determining that the closure timing of the intake valve is in the transient state; calculating a volume air quantity within the cylinder on the basis of the calculated volume of the cylinder and a fresh-air rate within the cylinder; calculating a mass air quantity sucked into the cylinder on the basis of a mass air quantity within an intake manifold of the engine calculated by income and outgo calculations of inflow and outflow quantities of a mass air within the intake manifold and a volume of the intake manifold; and calculating a fuel injection quantity on the basis of the mass air quantity sucked into the cylinder.

This summary of the invention does not necessarily describe all necessary features so that the invention may also be a sub-combination of these described features.

DETAILED DESCRIPTION OF THE PREFERRED EMBODIMENT

Reference will hereinafter be made to the drawings in order to facilitate a better understanding of the present invention.

Figure 1:
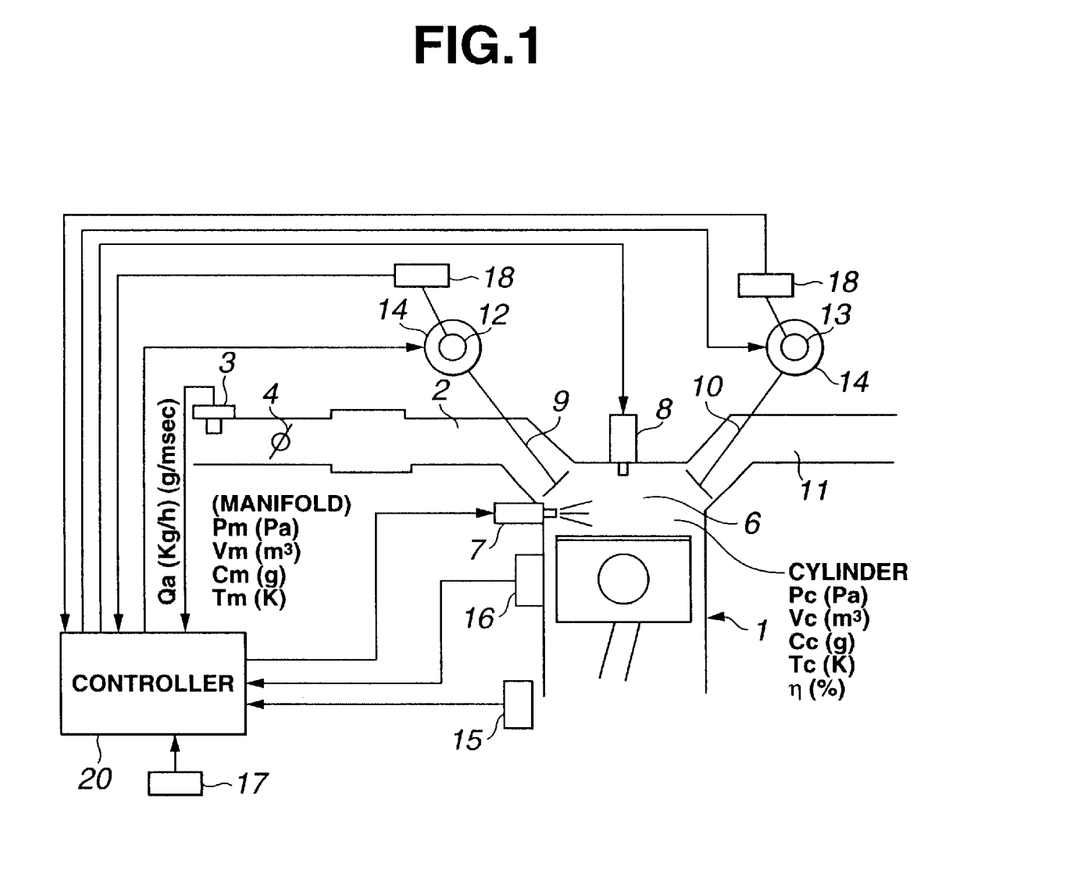
FIG. 1 is a system configuration view of an engine having a variably operated engine valve to which an embodiment of a fuel injection control apparatus according to the present invention is applicable.

FIG. 1 shows a rough system configuration of an engine to which an embodiment of a fuel injection control apparatus according to the present invention is applicable.

As shown in FIG. 1, an airflow meter 3 to detect an intake-air flow quantity is disposed on an intake-air passage 2 of engine 1 and a throttle valve 4 adjusts an intake-air flow quantity Q. In each cylinder, a fuel injection valve (or called, a fuel injector) 7 injects a fuel into a combustion chamber 6. In addition, a spark plug 8 carries out a spark ignition within combustion chamber 6. A fuel is injected from fuel injection valve 7 to a sucked air via intake valve 9 to form an air mixture fuel, is compressed within combustion chamber 6, and is ignited in a spark ignition by means of spark plug 10. An exhaust gas of engine 1 is exhausted into an exhaust passage 11 from a combustion chamber 6 via an exhaust valve 10 and is discharged to the air via an exhaust purification medium and muffler (not shown).

Intake valve 9 and exhaust valve 10 are driven in open-and-closure directions by means of cams disposed on an intake side camshaft 12 and an exhaust side camshaft 13. A variable valve timing mechanism 14 to advance angularly or retard angularly open and closure timings of intake valve 9 and exhaust valve 10 is disposed on each of intake side camshaft 12 and exhaust side camshaft 13, respectively, by varying a rotational phase of each corresponding camshaft with respect to a crankshaft.

It is noted that operations of the throttle valve 4, fuel injection valve 7, and spark plug 8 are controlled by means of a controller (or so-called, a control unit) 20. Controller 20 receives various detected signals from crank angle sensor 15, a cam angle sensor 18, a coolant temperature sensor 16, an airflow meter 3, and so forth.

In addition, controller 20 detects a rotational phase (VTC phase) of intake side camshaft 12 with respect to the crankshaft and detects a rotational phase (VTC phase) of the exhaust side camshaft 13 with respect to the crankshaft, respectively, on the basis of the detected signals of crank angle sensor 15 and cam angle sensors 18 on intake and exhaust side camshafts 12 and 13. Consequently, open-and-closure timings of intake valve 9 and exhaust valve 10 are detected. A target phase angle of each of intake side camshaft 12 and exhaust side camshaft 13 (advance angle value or retardation angle value) is determined on the basis of such an information as an engine load, an engine speed Ne, a coolant temperature Tw so that the open-and-closure timings of both intake valve 9 and exhaust valve 10 are controlled.

Fuel injection start timing and fuel injection quantity of fuel injection valve 7 are controlled on the basis of an engine driving condition. The fuel quantity (fuel injection pulsewidth) Tp is, basically, calculated to provide a desired air-fuel ratio for a cylinder intake-air quantity (mass air quantity within a cylinder) Cc calculated, as will be described later, on the basis of an intake-air quantity (mass air quantity) Qa measured by airflow meter 3. Next, a calculation of cylinder intake-air quantity (or, called, mass air quantity within the cylinder) Cc used to calculate fuel injection pulsewidth Tp will be described below.

Figure 2A:
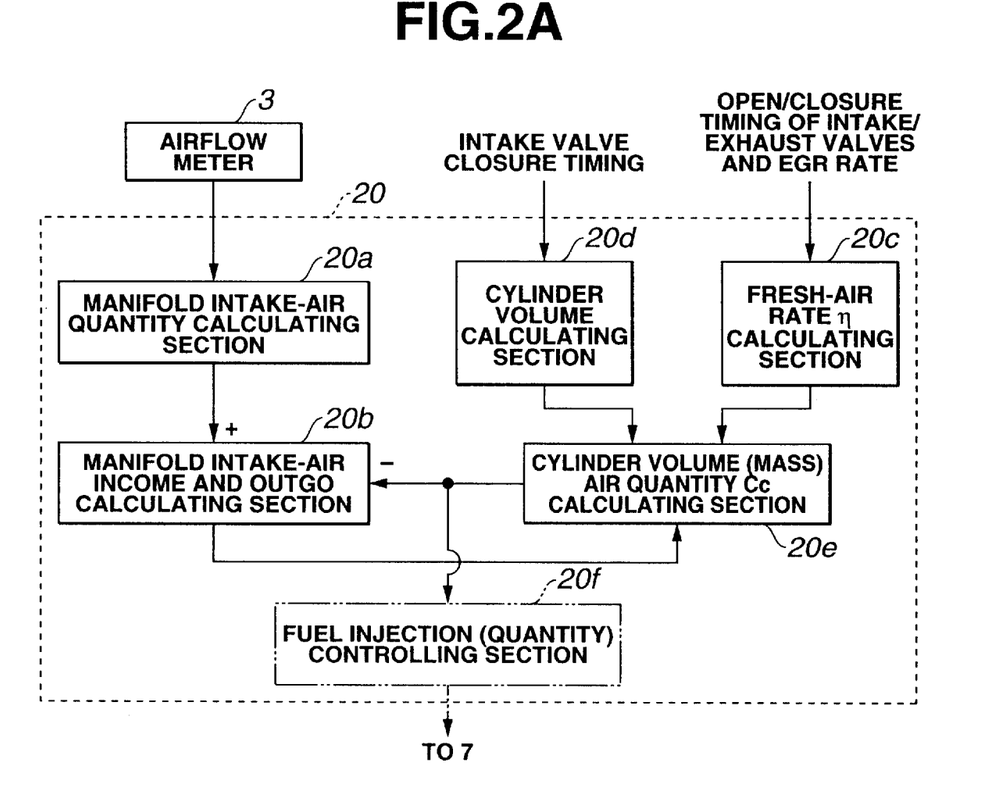
FIGS. 2A and 2B are a schematic functional block diagram of a controller shown in FIG. 1 to execute a calculation of a cylinder intake-air quantity and a circuit block diagram of the controller shown in FIG. 1, respectively.
Figure 2B:
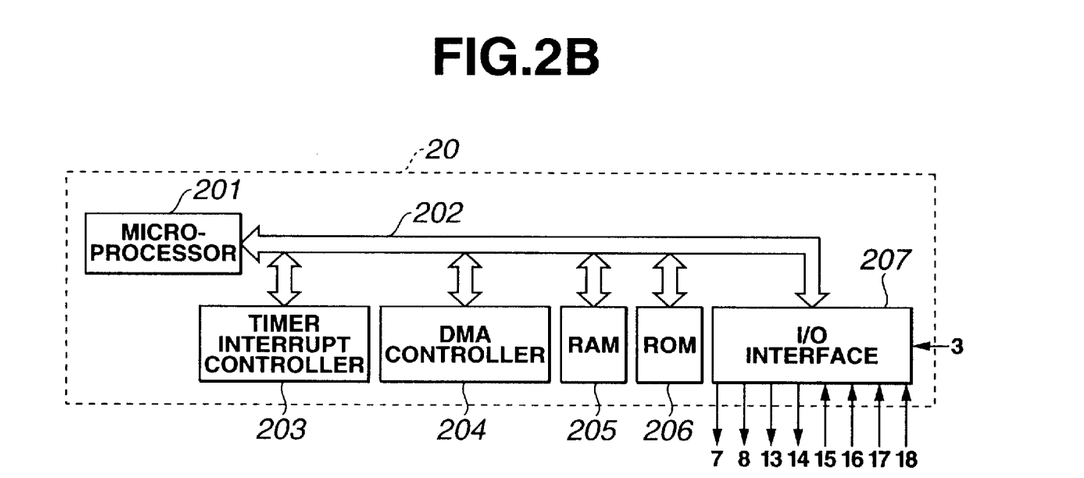

It is noted that FIG. 2A shows a schematic functional block diagram of controller 20 and FIG. 2B shows a schematic circuit block diagram of controller 20, it is also noted that, as shown in FIG. 1, the intake-air quantity (mass flow quantity) measured by airflow meter (mass flow quantity) is Qa (in a unit of Kg/h) but the unit is converted by a multiplication of Qa (Kg/h) with 1/3600 into Qa (in a unit of g/msec.).

In addition, suppose that a pressure in intake manifold is Pm (Pa), a volume thereof is Vm ($m^3$: constant), mass air quantity is Cc (g), a temperature is Tc (K), and a fresh-air rate within a cylinder is η (%).

Suppose, then, that Pm=Pc and Tm=Tc (pressure and temperature between the intake manifold and the cylinder are not varied).

Figure 3:
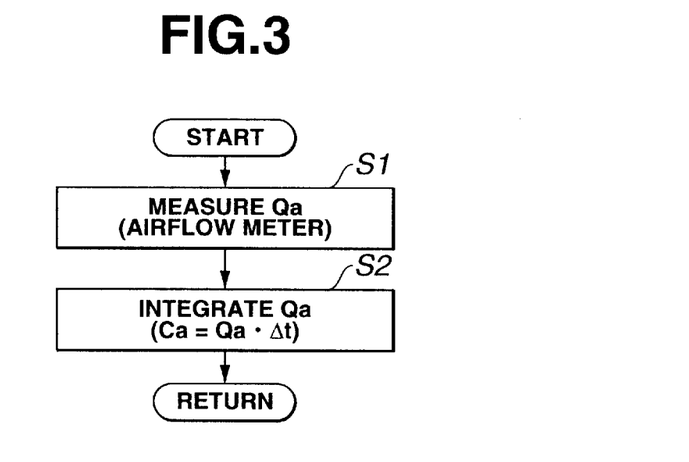
FIG. 3 is an operational flowchart representing a calculation routine of an inflow air quantity of an intake manifold.

FIG. 3 shows an operational flowchart to calculate an inflow air quantity Ca in intake manifold which is executed for each predetermined period of time Δt.

At a step S1, controller 20 measures intake-air quantity Qa (the unit is mass flow quantity of g/msec) from an output signal from airflow meter 3.

At a step S2, controller 20 integrates an intake-air quantity of Qa to calculate air quantity Ca (air mass; g) flowing into manifold for each predetermined period of time Δt (that is to say, a cycle time of the routine shown in FIG. 3 and Ca=Qa·Δt).

Figure 4:
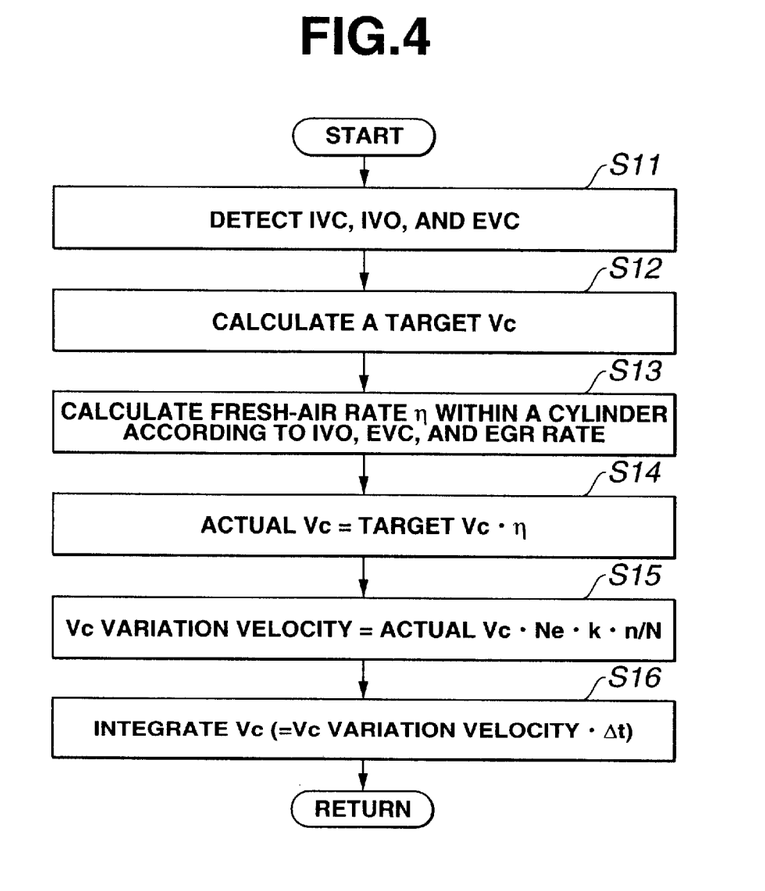
FIG. 4 is an operational flowchart representing a calculation routine of an air volume quantity of the cylinder.

FIG. 4 shows an operational flowchart representing a calculation routine of cylinder volume air quantity Vc and which is executed by controller 20 for each predetermined period of time Δt. At a step S11, controller 20 detects respective VTC phases of intake and exhaust side camshafts 12 and 13, respectively, and detects closure timing IVC and open timing IVO of intake valve 9 and closure timing EVC of exhaust valve 10.

At a step S12, controller 20 calculates the cylinder volume instantaneously at a time of the closure timing IVC of intake valve 9 from the closure timing IVC of intake valve 9. The calculated cylinder volume is a target Vc($m^3$). Target Vc is calculated according to a stroke variable S and a piston surface area A as given in the following equation (1). Stroke variable S is calculated by a position θ° (hereinafter, IVC angle) from a bottom dead center (BDC) at a suction stroke as shown in the following equation (2)

$$\text{Target } Vc = A \cdot S \tag{1}$$

$$S = r \cdot \cos\theta + L + r - (L^2 - r^2 \sin^2\theta)^{1/2} \tag{2}$$

wherein L denotes a connecting rod length and r=St/2, wherein St denotes a stroke length by which a corresponding piston strokes from TDC (top dead center) to BDC.

Figure 5:
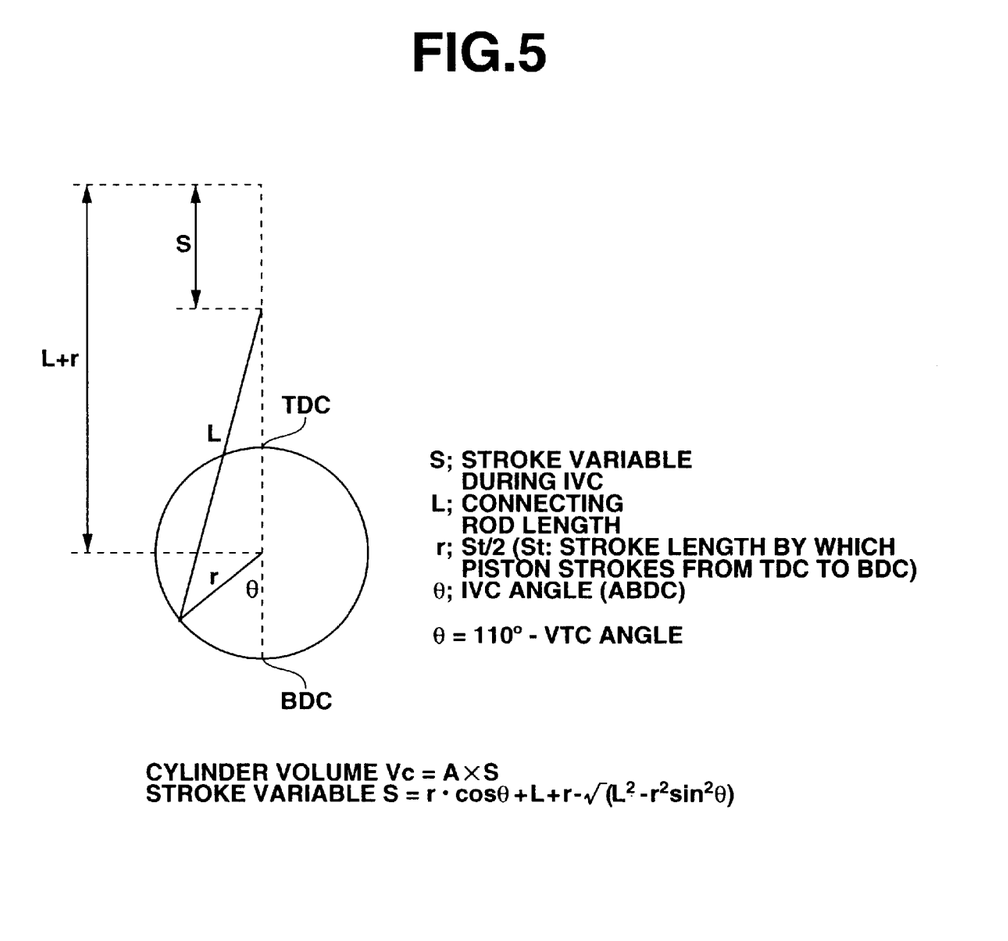
FIG. 5 is an explanatory view for explaining a stroke variable calculation at a closure timing of an intake valve.

In this embodiment, as shown in FIG. 5, the above-described IVC angle θ is calculated in such a way that an advance angle quantity (hereinafter called, VTC angle) is subtracted from closure timing of intake valve 9 (in FIG. 5, ABDC 110° CA) when intake side camshaft 12 is controlled toward a most retardation angle side (∴θ=110°−VTC angle). The advance angle value (VTC angle) VTC4TP used to calculate fuel injection pulsewidth Tp is set in accordance with a subroutine shown in FIG. 6. It is noted that the term of VTC is an abbreviation for a Variable Timing Control.

Figure 6:
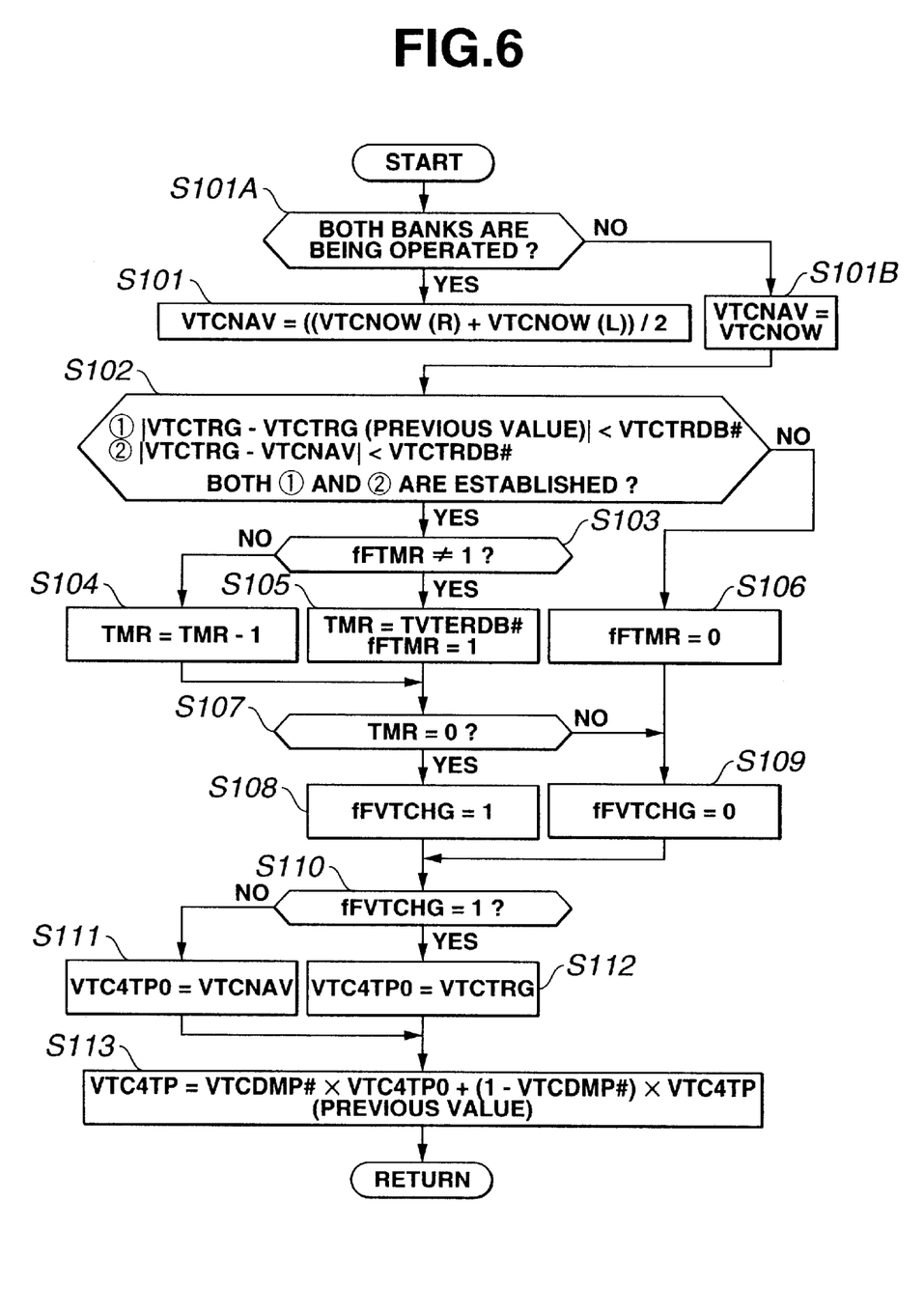
FIG. 6 is an operational flowchart representing a subroutine of setting the closure timing (advance angle value) of the intake valve used to calculate a cylinder volume in a case of the engine having two cylinder banks.

That is to say, in FIG. 6, controller 20 determines whether both (cylinder) banks are being operated at a step S101A. If Yes (both cylinder banks are being operated) at step S101A, the subroutine of FIG. 6 goes to a step S101. If No at step S101A, the routine goes to a step-S101B.

At step S101, controller 20 calculates advance angle value (actual VTC angle) of intake valve 9 from a cam phase of intake side camshaft 12 and calculates an average value VTCNAV of actual VTC as follows:

$$\text{VTCNAV} = (\text{VTCNOW}(R) + \text{VTCNOW}(L))/2 \tag{3}$$

If, at step 101A, either one of the two cylinder banks is stopped, VTCNOW is directly used for VTCNAV as shown in the following equation (4).

$$\text{VTCNAV} = \text{VTCNOW} \tag{4}$$

It is noted that FIG. 6 shows the subroutine in a case of the engine having two cylinder banks and steps 101A and 101B are added for a V type engine of the two cylinder banks. In a case of one bank type engine, the subroutine of FIG. 6 directly goes to step S101B.

At a step 102, controller 20 determines if a target advance angle of intake valve 9 (hereinafter, called a target VTC angle) VTCTRG is approximately constant or not and determines if actual VTC angle average value VTCNAV follows target VTC angle VTCTRG.

Specifically, controller 20 determines whether both conditions such that an absolute value of a variation rate between a previous (for example, prior to 10 milliseconds) VTCTRG and a present VTCTRG is smaller than a first predetermined value VTCTRDB and an absolute value of a deviation between VTCTRG and VTCNAV is smaller than a second predetermined value VTERDB are established. If neither of the two conditions is established or one of the both conditions is not established (No) at step S102, the subroutine goes to a step S109 via a step S106. At steps S106 and S109, a delay timer TMR (decrement (down) counter) activation determination flag fFTMR and a steady-state condition determination flag fFVYCHG are cleared to zero. At steps S110 and S111, VTC angle VTC4TPO used to calculate fuel injection width Tp is set to VTCNAV (VTC4TP0=VTCNAV). On the other hand, if both conditions are established (Yes) at step S102, the routine goes to a step S103. At step S103, controller 20 determines if delay timer TMR is activated or not activated. If delay timer TMR is not activated (fFTMR≠1) (Yes) at step S103, the subroutine goes to a step S105. At step S105, an initial value TVTERDB of delay timer is set to timer TMR and flag fFTMR is set to "1". It is noted that the initial value TVTERDB is, for example, 50 so that a predetermined interval of time described in claims corresponds to 500 milliseconds (msec) since Δt=10 msec.

If fFTMR=1 (delay timer being activated) (No) at step S103, the routine goes to a step S104. At step S104, TMR=TMR−1 (count value of delay timer TMR is decremented by one). At step S107, controller 20 determines if count value of delay timer TMR is decremented to zero or not. If TMR≠0 (No) at step S107, the subroutine goes to step S109.

At step S109, a steady-state establishment determination flag fFVTCHG is cleared. Controller 20 determines if fFVCHG=1 at step S110, the subroutine goes to a step S112 at which VTC4TPO=VTCTRG. Then, the subroutine goes to a step S113.

At step S113, controller 20 executes a weighted mean process for the above-described set VTC angle VTC4TPO used to calculate Tp to derive VTC4TP.

$$VTC4TP = VTCDMP \times VTC4TPO + (1 - VTCDMP) \times VTC4TP \text{ (previous value)} \tag{5}$$

wherein VTCDMP denotes a predetermined weight coefficient.

Controller 20 calculates IVC angle θ according to VTC angle VTC4TP used to calculate fuel injection pulsewidth Tp (θ=100°−VTC4TP) and calculates target Vc according to equations (1) and (2).

Referring back to FIG. 4, controller 20 calculates an open timing IVO of intake valve 9, the closure timing of exhaust valve 10, and an internal cylinder fresh-air rate η (%) on the basis of EGR (Exhaust Gas Recirculation) rate, if necessary. In details, a valve overlap quantity is determined according to open timing IVO if intake valve 9 and closure timing EVC of exhaust valve 10. As the overlap quantity becomes large, a residual gas (internal EGR) becomes large. Hence, the internal cylinder fresh-air rate η is derived on the basis of the overlap quantity. In addition, in the engine equipped with a variably operated engine valve (so-called, a variable valve timing device), a control of the overlap quantity enables a control of internal EGR flexibly. Hence, in general, an EGR device (external EGR) is not provided. If provided, furthermore, a final internal cylinder fresh-air rate η is determined with the EGR rate taken into consideration in a case where the external EGR rate is installed.

At the next step S14, controller 20 calculates actual Vc(m³)=target Vc·η corresponding to target air quantity. Actual Vc(m³) corresponds to an cylinder intake-air. At step S14, controller 20 multiplies target Vc by fresh air rate η within the cylinder to calculate actual Vc(m³)=target Vc·η corresponding to target air quantity. The actual Vc(m³) corresponds to cylinder intake air quantity (volume).

At a step S15, controller 20 multiplies actual Vc(m³) corresponding to target air quantity by engine speed Ne (rpm) to calculate a variation velocity of Vc (volumetric flow quantity; m³/msec). Vc variation velocity=actual Vc·Ne·K, wherein K denotes a constant to convert different units into a single unit and K=1/30×(1/1000), 1/30 is a conversion of Ne (rpm) into Ne (180 deg/sec) and 1/1000 is a conversion of Vc(m³/sec) and 1/1000 is a conversion of Vc(m³/sec) to Vc(m³/msec).

In addition, in a case where such a control as a stop of a part of cylinders is executed, variation velocity of Vc is given by the following equation: Vc variation velocity= actual Vc·Ne·K·n/N. In this equation, n/N denotes a ratio of operation when a part of cylinders is stopped, N denotes the number of cylinders, n denotes a number of cylinders in operation. Hence, in a case where four-cylinder engine and one cylinder is not operated, n/N=3/4. It is noted that, in a case where the operation of a particular cylinder is stopped, a fuel supply to the particular cylinder is cut off with each of intake valve(s) and exhaust valve(s) held in a full closure state.

At a step S16, controller 20 integrates Vc variation rate (volumetric flow quantity; m$^3$/sec) and calculates cylinder volume air quantity Vc(m$^3$)=Vc variation velocity·Δt which is an air quantity sucked into a cylinder per unit time (one millisecond).

Figure 7:
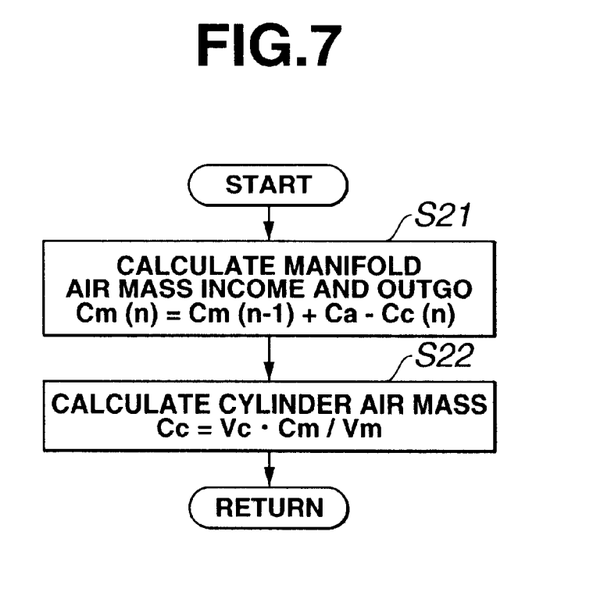
FIG. 7 is an operational flowchart representing a continuous calculation routine of income and outgo of intake air within the intake manifold and cylinder volume air quantity calculation.

FIG. 7 shows a flowchart of a continuous calculation (calculations on a manifold intake-air income and outgo and cylinder mass air quantity Vc) and executed repeatedly for each predetermined period of time Δt.

At a step S21, controller 20 adds mass air quantity Ca (=Qa·Δt) flowing into the manifold determined at the routine of FIG. 3 to a previous value Cm(n−1) of mass air quantity of manifold as shown in the following equation for the income and outgo calculations in the manifold (income and outgo calculations of mass air quantity in the manifold). In addition, mass air quantity Cc(n) which is the cylinder intake-air quantity flowing out from the manifold to the cylinder is subtracted from the addition of the previous value Ca (=Qa·Δt) to derive manifold mass air quantity Cm(n)(g). Cm(n)=Cm(n−1)+Ca−Cc(n). It is noted that Cc(n) used herein is Cc calculated at the next step 22 at the previous routine.

At a step S22, controller 20 calculates cylinder intake-air quantity (cylinder mass air quantity Cc). As described in the following equation (4), cylinder volume air quantity Vc determined at the routine of FIG. 4 is multiplied by mass air quantity Cm of manifold and is divided by manifold volume Vm (constant value) to determine mass air quantity Cc(g) of cylinder.

At the next step 22, controller 20 multiplies mass air quantity Cm of manifold by cylinder volume air quantity Vc determined at the routine shown in FIG. 4.

$$Cc=Vc\cdot Cn/Vm \quad (6).$$

Equation (6) can be derived as follows: That is to say, from gas state equation P·V=C·R·T, C=P·V/(R·T). Hence, as far as the cylinder is concerned, Cc=Pc·Vc/(R·Tc). Since the following conditions are established, i.e., $$Pc=Pm \text{ and } Tc=Tm,\ Cc=Pm\cdot Vc/(R\cdot Tm) \quad (8).$$

On the other hand, since P/(R·T)=C/V from gas state equation P·V=C·R·T, the manifold section gives $$Pm/(R\cdot Tm)=Cm/Vm \quad (9).$$

If equation (9) is substituted into equation (8), $$Cc=Vc\cdot[Pm/(R\cdot Tm)]=Vc[Cm/Vm].$$

Consequently, the above equation (6) can be derived.

Figure 8:
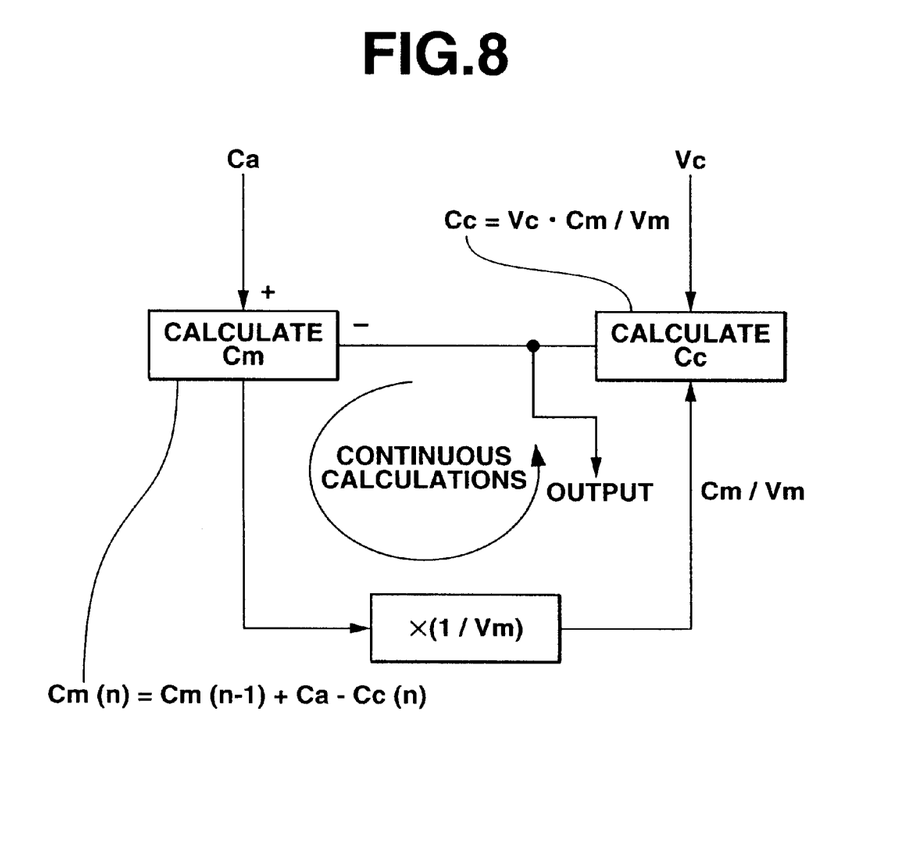
FIG. 8 is a block diagram representing the continuous calculation shown in FIG. 7.

As described above, since steps 21 and 22 are repeatedly executed, namely, the continuous calculation is carried out as shown in FIG. 8 to determine cylinder mass intake-air quantity Cc(g) which is a cylinder intake-air quantity. Then, cylinder mass intake-air quantity Cc(g) can be outputted.

It is noted that a processing sequence of steps S21 and S22 in FIG. 7 may be reversed.

Figure 9:
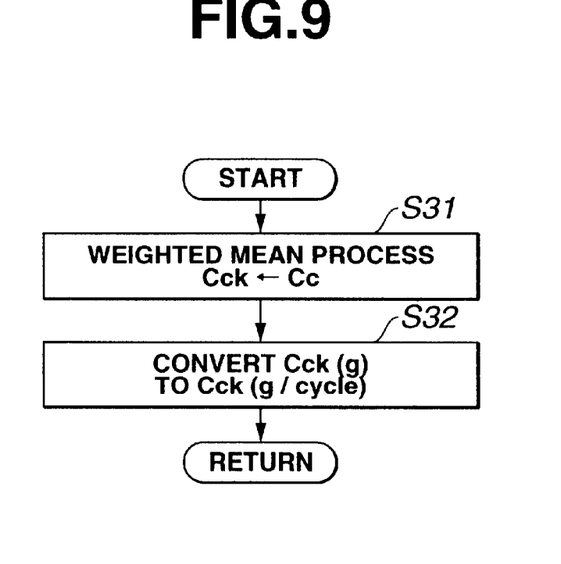
FIG. 9 is an operational flowchart of an example of a post-processing routine after the continuous calculation shown in FIGS. 7 and 8.

FIG. 9 shows an operational flowchart of a post-processing routine.

At a step S31, a weighted mean process of cylinder mass air quantity Cck(g) is executed to calculate Cc(g).

$$Cck=Cck\times(1-M)+Cc\times M,$$

wherein M denotes a weighted mean constant and 0<M<1.

At a step S32, in order to synchronize a cylinder mass air quantity Cck(g) with an engine cycle, cylinder mass air quantity Cck(g) after the weighted mean process execution, engine speed Ne (rpm) is used; namely, Cck (g/cycle)=Cck/(120/Ne). Consequently, Cck(g) is converted into cylinder mass air quantity (g/cycle) for each cycle (two revolutions= 720 degrees). It is noted that the weighted mean process can provide a compatibility between a control accuracy and a control response characteristic if the weighted mean process is limitedly used when a ripple of intake-air flow is large as in a state where the throttle valve is largely opened (at a full open position).

Figure 10:
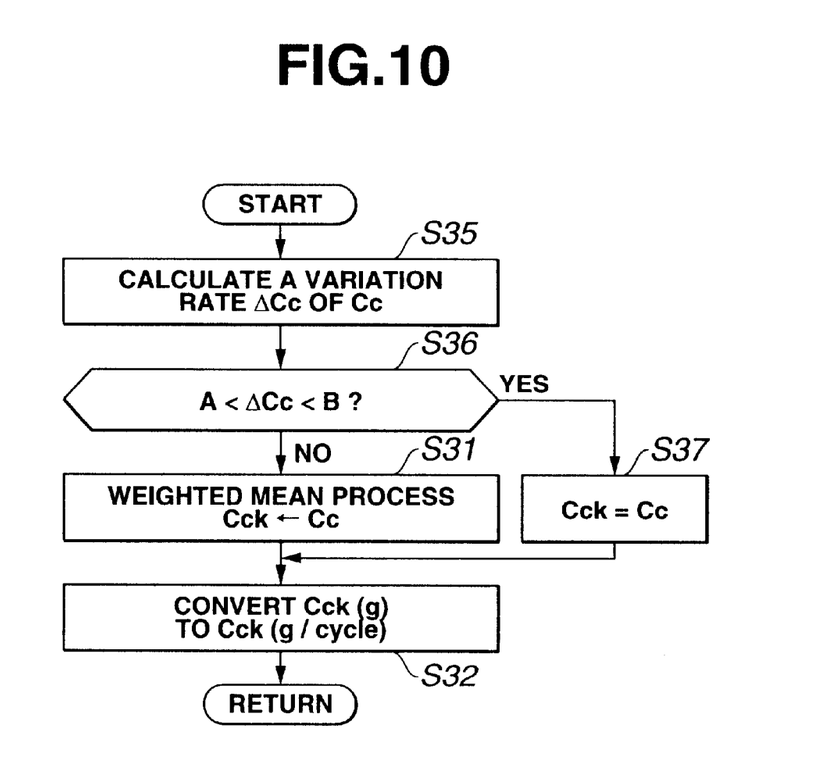
FIG. 10 is another flowchart representing another example of the post-processing routine.

FIG. 10 shows an operational flowchart of a post-procedure routine in the case of the weighted mean process.

At a step S35, controller 20 calculates a variation irate ΔCc of cylinder mass air quantity Cc(g). At a step S36, controller 20 determines if variation rate ΔCc falls within a predetermined range (A<ΔCc<B, wherein ΔCc falls within a predetermined range (A<ΔCc<B, ΔCc is greater than A but is smaller than B). If Yes at step S36, the routine goes to a step S37 at which Cck=Cc since no weighted mean is needed. Then, the routine goes to a step S32 in FIG. 10. At step S32, controller 20 converts Cck(g) to Cckg (g/cycle) for each cycle (two revolutions=720 degrees) in the same manner as step S32 in FIG. 9.

If variation rate ΔCc falls out of the predetermined range (No) at step S36, controller 20 executes the weighted mean of cylinder mass air quantity Cc(g) at step S31 in FIG. 10 in the same manner as step S31 in FIG. 9 to calculate Cck(g). Then, the routine goes to step S32 in FIG. 10.

The fuel injection quantity (fuel injection pulsewidth Tp) is calculated on the basis of cylinder intake-air quantity (cylinder mass air quantity Cc and Cck) and engine speed Ne detected by crank angle sensor 15.

As described above, since the cylinder volume is used which is calculated from the control target value of the closure timing of the intake valve (in the embodiment, the target advance angle value) when the closure timing of the intake valve is in the steady state, the variation in the fuel injection quantity (fuel injection pulsewidth Tp) calculated on the basis of the cylinder intake-air quantity can accurately be prevented even if the detected value (signal) of the closure timing of intake valve is varied due to the load variation or bit-error. Consequently, the variation in the air-fuel ratio or the reduction in the driveability can be suppressed.

In the embodiment, such a variably operated engine valve (hydraulic drive type) that the rotational phase of the camshaft to the crankshaft is variably controlled. However, the present invention is not limited to this. Such another type of the variably operated valve device that the open and closure timings of the intake valve and exhaust valve can mutually independently be controlled and respective lift sensors such as Hall Effect devices may be used to detect the open and closure timings of the intake and exhaust valves as an electromagnetically operated engine valve type.

Figure 11:
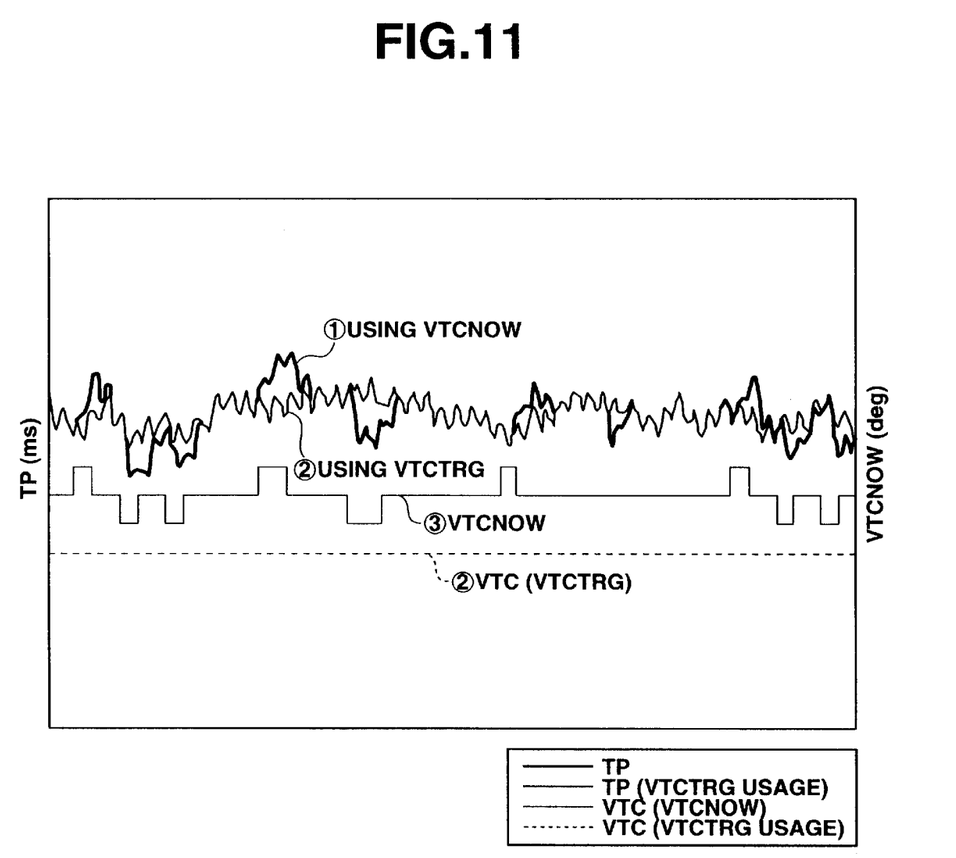
FIG. 11 is a characteristic graph representing a comparison between fuel injection pulses in cases where an actual closure timing VTCNOW of the intake valve ② and a control target value VTCTRG of the closure timing of the intake valve ① are respectively used.

It is noted that, in FIG. 2A, a manifold intake-air quantity calculating section 20a corresponds to steps S1 S2 in FIG. 3, manifold intake-air income and outgo calculating section 20b corresponds to a manifold mass air quantity Cm(n) calculating step shown in FIG. 8, a fresh-air rate η calculating section 20c corresponds to step S13 shown in FIG. 4, a cylinder volume calculating section 20d corresponds to step S12 shown in FIG. 4, a cylinder volume air quantity calculating section 20e corresponds to steps S21 and S22 in FIG. 7 and to Cc calculating step shown in FIG. 8, and a fuel injection control section 20f calculates the fuel injection pulse Tp on the basis of cylinder mass air quantity Cc derived at the cylinder volume air quantity calculating section 20e in FIG. 8. In addition, controller 20, as shown in FIG. 2B, includes a microcomputer having a microprocessor 201, a common bus 202, a timer interrupt controller 203, a DMA (Direct Memory Access) controller 204, RAM (Random Access Memory) 205, ROM (Read Only Memory) 206, and I/O (Input/Output) interface 207. It is also noted that, as appreciated from FIG. 11, when the closure timing of the intake valve is in the steady state, the variation in fuel injection pulse Tp using VTCNOW (bold solid line ①) is more remarkable than that Tp using VTCTRG (thin solid line ②).

The entire contents of a Japanese Patent Application No. 2001-028822 (filed in Japan on Feb. 5, 2001) are herein incorporated by reference. Various modifications and variations can be made without departing from the sprit of the present invention. The scope of the invention is defined with reference to the following claims.

What is claimed is:

1. A fuel injection control apparatus for an engine having a variably operated engine valve in which at least a closure timing of an intake valve is variably controlled, the fuel injection control apparatus comprising:

an intake valve closure state determining section that determines whether a closure timing of the intake valve is in a steady state or in a transient state; and a fuel injection quantity calculating section that calculates a volume of a cylinder from a control target value of the closure timing of the intake valve when the intake valve closure state determining section determines that the closure timing of the intake valve is in the steady state and from an actual closure timing of the intake valve when the intake valve closure state determining section determines that the closure timing of the intake valve is in the transient state, calculates a volume air quantity within the cylinder on the basis of the calculated volume of the cylinder and a fresh-air rate within the cylinder, calculates a mass air quantity sucked into the cylinder on the basis of a mass air quantity within an intake manifold of the engine calculated by income and outgo calculations of inflow and outflow quantities of a mass air within the intake manifold and a volume of the intake manifold, and calculates a fuel injection quantity on the basis of the mass air quantity sucked into the cylinder.

2. A fuel injection control apparatus for an engine having a variably operated engine valve in which at least a closure timing of an intake valve is variably controlled as claimed in claim 1, wherein the intake valve closure state determining section determines that the closure timing of the intake valve is in the steady state when the target value of the closure timing of the intake valve is approximately constant and determines otherwise that the closure timing of the intake valve is in the transient state.

3. A fuel injection control apparatus for an engine having a variably operated engine valve in which at least a closure timing of an intake valve is variably controlled as claimed in claim 1, wherein the intake valve closure state determining section determines that the closure timing of the intake valve is in the steady state when a deviation between the actual closure timing of the intake valve and the control target value thereof falls within a predetermined range and determines otherwise that the closure timing of the intake valve is in the transient state.

4. A fuel injection control apparatus for an engine having a variably operated engine valve in which at least a closure timing of an intake valve is variably controlled as claimed in claim 1, wherein the intake valve closure state determining section determines that the closure timing of the intake valve is in the steady state when the control target value of the closure timing of the intake valve is approximately constant and a deviation between the actual closure timing of the intake valve and the control target value thereof falls within a predetermined range and determines otherwise that the closure timing of the intake valve is in the transient state.

5. A fuel injection control apparatus for an engine having a variably operated engine valve in which at least a closure timing of an intake valve is variably controlled as claimed in claim 1, wherein the fuel injection quantity calculating section calculates the volume of the cylinder from the control target value of the closure timing of the intake valve after a predetermined interval of time has elapsed upon a determination by the intake valve closure state determining section that the closure timing of the intake valve is in the steady state.

6. A fuel injection control apparatus for an engine having a variably operated engine valve in which at least a closure timing of an intake valve is variably controlled as claimed in claim 1, further comprising a weighted mean processing section that executes a weighted mean for at least one of the control target value of the closure timing of the intake valve used to calculate the volume of the cylinder and the actual closure timing of the intake valve used to calculate the volume of the cylinder.

7. A fuel injection control apparatus for an engine having a variably operated engine valve in which at least a closure timing of an intake valve is variably controlled as claimed in claim 1, further comprising a weighted mean processing section that executes a weighted mean for either the actual closure timing of the intake valve used to calculate the volume of the cylinder or the control target value of the closure timing of the intake valve used to calculate the volume of the cylinder depending on a result of a determination by the intake valve closure state determining section.

8. A fuel injection control apparatus for an engine having a variably operated engine valve in which at least a closure timing of an intake valve is variably controlled as claimed in claim 1, wherein the engine comprises a plurality of cylinder banks and, for the actual closure timing of the intake valve, an average value of the actual closure timings of the intake valves in the respective cylinder banks when all cylinder banks are operated is used and another average value of the actual closure timings of the intake valves in a part of the cylinder banks which is operated when the part of the cylinder banks is operated while the remaining part of the cylinder banks is stopped is used.

9. A fuel injection control apparatus for an engine having a variably operated engine valve in which at least a closure timing of an intake valve is variably controlled as claimed in claim 1, wherein the engine is provided with the variably operated engine valve for each of engine cylinders and, for the actual closure timing of the intake valve, an average value of the closure timings of the intake valves of the respective cylinders which are operated is used.

10. A fuel injection control apparatus for an engine having a variably operated engine valve in which at least a closure timing of an intake valve is variably controlled as claimed in claim 1, wherein the volume of the cylinder is calculated in the following equation: $Vc = S \cdot A$, wherein $S = r \cdot \cos\theta + L + r - (L^2 - r^2 \sin^2\theta)^{1/2}$, wherein Vc denotes the volume of the cylinder, A denotes a piston surface area, $\theta$ denotes a crank angular position of the actual closure timing of the intake valve with respect to a bottom dead center at a suction stroke in the cylinder, L denotes a connecting rod length, and r=St/2, wherein St denotes a stroke length by which a piston strokes from a top dead center to the bottom dead center.

11. A fuel injection control apparatus for an engine having a variably operated engine valve in which at least a closure timing of an intake valve is variably controlled as claimed in claim 1, wherein the engine comprises at least two cylinder banks, further comprising a bank operation determining section that determines whether both of the two cylinder banks of the engine are being operated, and wherein the intake valve closure state determining section determines whether a target advance angle VTCTRG of the closure timing of intake valve is approximately constant and an average value VTCNAV of an actual advance angle of the closure timing of the intake valve follows the target advance angle VTCTRG of the closure timing of the intake valve to determine whether the closure timing of the intake valve is in the steady state or in the transient state.

12. A fuel injection control apparatus for an engine having a variably operated engine valve in which at least a closure timing of an intake valve is variably controlled as claimed in claim 11, further comprising an actual advance angle detecting section that detects the actual advance angle VTCNOW of the closure timing of the intake valve from a cam phase of an intake side camshaft of the engine, and wherein the intake valve closure state determining section comprises an averaging section that, when the bank operation determining section determines that both banks are being operated, averages the actual advance angle VTCNOW of the closure timing of the intake valve as follows: VTCNAV= [VTCNOW(R)+VTCNOW(L)]/2, wherein VTCNOW(R) denotes the actual advance angle VTCNOW of the closure timing of the intake valve belonging to a right cylinder bank and VTCNOW(L) denotes the actual advance angle VTCNOW of the closure timing of the intake valve belonging to a left cylinder bank, and wherein the intake valve closure state determining section, when the bank operation determining section determines that one of the banks is being operated, sets the average actual advance angle VTCNAV of the closure timing of the intake valve to the actual advance angle VTCNOW of the closure timing of the intake valve belonging to the operated cylinder bank (VTCNAV= VTCNOW).

13. A fuel injection control apparatus for an engine having a variably operated engine valve in which at least a closure timing of an intake valve is variably controlled as claimed in claim 12, wherein the intake valve closure state determining section determines whether an absolute value of a variation value between a previous value of the target advance angle value VTCTRG and a present value of the target advance angle value VTCTRG is smaller than a first predetermined value VTCTRDB and another absolute value of a deviation between the target advance angle VTCTRG of the closure timing of the intake valve and the average value of the actual advance angle of the closure timing of the intake valve VTCNAV is smaller than a second predetermined value VTCTRDB to determine whether the closure timing of the intake valve is in the steady state or in the transient state.

14. A fuel injection control apparatus for an engine having a variably operated engine valve in which at least a closure timing of an intake valve is variably controlled as claimed in claim 13, further comprising a delay timer which decrements a preset value TVTERDGE thereof whenever a predetermined time has elapsed from a time point at which the intake valve closure state determining section determines that the absolute value of the variation value is smaller than the first predetermined value VTCTRDB and the other absolute value of the deviation is smaller than the second predetermined value VTCTRDB and that the intake valve closure state determining section determines that the closure timing of the intake valve is in the steady state.

15. A fuel injection control apparatus for an engine having a variably operated engine valve in which at least a closure timing of an intake valve is variably controlled as claimed in claim 14, further comprising: a delay timer count value determining section that determines whether a count value of the delay timer has been decremented and has reached to zero; an advance angle calculating section that calculates an advance angle VTC4TP0 of the closure timing of the intake valve used to calculate a fuel injection pulsewidth Tp corresponding to the fuel injection quantity as follows: VTC4TP0=VTCTRG when the delay timer count value determining section determines that the count value of the delay timer has been decremented and has reached to zero (TMR=0); and VTC4TP0=VTCNAV when the intake valve closure state determining section determines that both or either of two conditions that the absolute value of the variation is smaller than the first predetermined value VTCTRDE or that the other absolute value of the deviation is smaller than the second predetermined value VTERDE is negated and when the delay timer count value determining section determines that the count value of the delay timer is not zero (TMR≠0); and a weighted mean processing section that executes a weighted mean for the advance angle VTC4TP0 of the closure timing of the intake valve used to calculate the fuel injection pulsewidth Tp to derive the weighted mean advance angle VTC4TP as follows: VTC4TP=VTCDMP×VTC4TP0+(1−VTCDMP)×VTC4TP (previous value of VTC4TP), wherein VTCDMP denotes a weighted coefficient.

16. A fuel injection control apparatus for an engine having a variably operated engine valve in which at least a closure timing of an intake valve is variably controlled as claimed in claim 15, further comprising a target cylinder volume calculating section that calculates a target cylinder volume (target Vc) on the basis of a crank angle value θ of the closure timing IVC of the intake valve which is calculated as follows: θ=110°−VTC4TP and wherein the fuel injection quantity calculating section calculates the volume air quantity within the cylinder (actual Vc) from the target cylinder volume (target Vc) and the fresh-air rate η.

17. A fuel injection control apparatus for an engine having a variably operated engine valve in which at least a closure timing of an intake valve is variably controlled, the fuel injection control apparatus comprising:
  intake valve closure state determining means for determining whether a closure timing of the intake valve is in a steady state or in a transient state; and
  fuel injection quantity calculating means for calculating a volume of a cylinder from a control target value of the closure timing of the intake valve when the intake valve closure state determining means determines that the closure timing of the intake valve is in the steady state and from an actual closure timing of the intake valve when the intake valve closure state determining means determines that the closure timing of the intake valve is in the transient state, calculating a volume air quantity within the cylinder on the basis of the calculated volume of the cylinder and a fresh-air rate within the cylinder, calculating a mass air quantity sucked into the cylinder on the basis of a mass air quantity within an intake manifold of the engine calculated by income and outgo calculations of inflow and outflow quantities of a mass air within the intake manifold and a volume of the intake manifold, and calculating a fuel injection quantity on the basis of the mass air quantity sucked into the cylinder.

18. A fuel injection control method for an engine having a variably operated engine valve in which at least a closure timing of an intake valve is variably controlled, the fuel injection control method comprising:

determining whether a closure timing of the intake valve is in a steady state or in a transient state;

calculating a volume of a cylinder from a control target value of the closure timing of the intake valve when determining that the closure timing of the intake valve is in the steady state and from an actual closure timing of the intake valve when determining that the closure timing of the intake valve is in the transient state;

calculating a volume air quantity within the cylinder on the basis of the calculated volume of the cylinder and a fresh-air rate within the cylinder;

calculating a mass air quantity sucked into the cylinder on the basis of a mass air quantity within an intake manifold of the engine calculated by income and outgo calculations of inflow and outflow quantities of a mass air within the intake manifold and a volume of the intake manifold; and calculating a fuel injection quantity on the basis of the mass air quantity sucked into the cylinder.

* * * * *